UNITED STATES PATENT OFFICE.

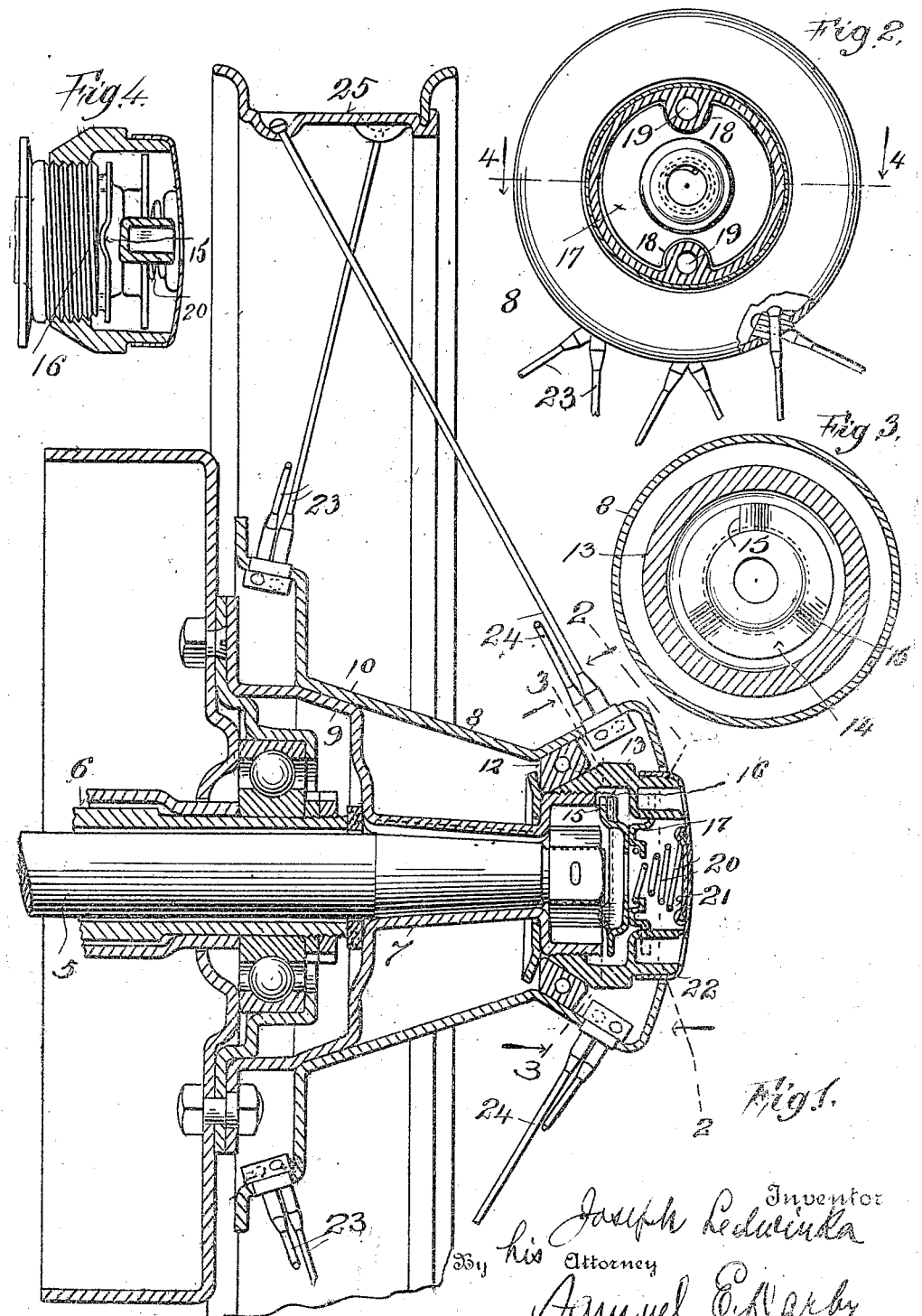

JOSEPH LEDWINKA, OF PHILADELPHIA, PENNSYLVANIA, ASSIGNOR, BY MESNE ASSIGNMENTS, TO BUDD WHEEL CORPORATION, OF PHILADELPHIA, PENNSYLVANIA, A CORPORATION OF VIRGINIA.

RETAINING DEVICE FOR WHEEL-HUB CAPS.

1,299,359.     Specification of Letters Patent.     Patented Apr. 1, 1919.

Application filed July 19, 1916. Serial No. 110,199.

*To all whom it may concern:*

Be it known that I, JOSEPH LEDWINKA, a citizen of the United States, residing at Philadelphia, in the county of Philadelphia, State of Pennsylvania, have made a certain new and useful Invention in Retaining Devices for Wheel-Hub Caps, of which the following is a specification.

This invention relates to detachable wheels, and particularly to devices for retaining the wheel hub cap in applied position.

The object of the invention is to provide a wheel hub cap retaining structure, which is simple, inexpensive to manufacture and easily assembled, and wherein the hub cap is retained in applied position frictionally and without employing positive locking means.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Referring to the drawing:

Figure 1 is a view in longitudinal section through a wheel hub structure showing a cap retaining mechanism embodying my invention applied thereto.

Fig. 2 is a view in section on the line 2, 2, Fig. 1, looking in the direction of the arrows.

Fig. 3 is a view in section on the line 3, 3, Fig. 1, looking in the direction of the arrows.

Fig. 4 is a broken view in section on the line 4, 4, Fig. 1, looking in the direction of the arrows.

The same part is designated by the same reference numeral wherever it occurs throughout the several views.

In the drawing I have shown my invention as applied to a semi-floating axle type of wheel unit, as merely illustrative of the application of my invention to an operative structure, but I wish it to be understood that my invention is not to be limited in its application to a wheel structure of the semi-floating axle type.

In the form shown 5 is the axle and 6 the sleeve of the ordinary semi-floating axle structure. Mounted to rotate with the axle is the axle sleeve 7, upon which is carried the wheel hub sleeve 8. The axle sleeve 7 and the wheel hub sleeve 8 are respectively provided with coöperating annular inclined seating portions or surfaces 9—10, adjacent their inner ends, which in the ordinary or suitable way may be adapted to lock said sleeves to rotate in unison. Adjacent its front end the wheel hub sleeve 8 is provided with a bearing portion 11, which, in this instance, is inclined outwardly and reversely with reference to the inclination of the seating surfaces 9—10. Adapted to engage against the bearing surface 11 are members 12, the function of which is, when forced into bearing contact with the portion 11, to force the sleeve 8, or the annular seating portion 10 thereof, into efficient seating relation with respect to the annular seating portion 9, of sleeve 7, and to lock the parts when so assembled and seated. The members 12 may be forced into bearing or clamping relation with respect to the sleeve 8 in any suitable or convenient manner. I propose to utilize the hub cap 13 for this purpose in which case the inner end of the cap is beveled to engage the members 12, and, when the cap is screwed up in place upon the threaded outer end of sleeve 7 for example, the beveled portion of the cap engages the members 12 and forces the latter readily against the inclined bearing surface or portion 11 of sleeve 8. This affords a simple structure of detachable clamping connection for clamping the wheel hub sleeve 8 upon the axle hub sleeve, and which permits the ready demounting of the wheel by simply unscrewing the cap nut, thereby releasing the members 12, and permitting the sleeve 8 to be slipped off of the axle hub sleeve 7.

It is desirable to provide means for efficiently retaining the hub cap in applied position when once screwed up to effect the clamping of the wheel hub sleeve in assembled relation with respect to the axle hub sleeve. A positive lock for retaining the hub cap in applied position is objectionable for the reason that the cap cannot be backed off from applied relation without first releasing the lock, and ordinarily this requires either a special tool for the purpose of releasing the lock, or else a special structure of the wrench employed to unscrew the cap. Moreover, a positive lock for the hub cap requires the cap to attain a fixed predetermined position when applied before the lock becomes effective. Through wear of the screw threads, and other causes, it is not always possible to bring the cap into this predetermined or fixed position to be locked and maintain efficiency of the lock, or of the application of the cap. To avoid these, and other objections, I propose to employ a friction device which, while not interfering with the rotation of the nut in turning it up or backing it off, when sufficient power is exerted in these operations, and without requiring the nut to attain any fixed or predetermined position, and without requiring the provision of a special tool, still is capable of performing the function of retaining the hub cap in any position to which it may be applied.

In accordance with my present invention I provide a friction member 14, having fluted portions 15, which friction member 14 is mounted to rotate with the hub cap 13, though movable axially of said cap, and which fluted portions coöperate with a surface having coöperating seats 16, associated with a convenient part fixed relatively with the screw cap 13. In the particular form shown, to which, however, my invention is not to be limited or restricted, the seats 16, with which the flutes 15 of the friction member 14, coöperate are formed in the end surface of the axle hub sleeve 7. The friction member 14 may be connected to rotate with the screw cap in any convenient manner, while at the same time it is independent of said cap. A simple arrangement for accomplishing this purpose is shown wherein the member 14, which is in the form of a disk, is secured to a coöperating disk 17, having recesses 18 in its peripheral edge in which are received the walls of the seats or depressions 19, formed in the outer end surface of the screw cap to receive the prongs of a spanner wrench by means of which the screw cap is turned up or backed off. The friction member 14 may be yieldingly pressed toward the fluted or seated surface with which it coöperates. A spring 20 is shown for accomplishing this result. The spring 20 is interposed between the friction member 14 and a plate 21, which is carried by a dust shell 22 which telescopes over the end of the nut 13.

The operation of the device is very simple. The friction member 14, and its carrying disk 17, shell 22, and interposed spring 20, are assembled and applied to the nut or cap. The cap then is screwed up, the flutes 15 snapping past the seats 16, until the desired application of the cap or nut 13 is accomplished. The friction of the member 14, or of the fluted portions 15 thereof, in coöperation with the surface or seat 16, being sufficient to retain the nut or cap in applied position, and prevent the same from being backed off by jars or shocks, without, however, interfering with the unscrewing of said cap or nut when it is desired to demount the wheel. A retaining device of the structure above set forth is well adapted for use in connection with any type of demountable wheel. I have shown my invention as applied to a wire spoked wheel wherein the spokes 23, 24, connect the wheel hub sleeve 8 and the rim 25. In the case of a wire spoked wheel any desired lacing arrangement may be employed. My invention, however, is not limited or restricted in respect to the wheel structure nor the lacing arrangement to be employed.

Having now set forth the objects and nature of my invention and a construction embodying the principles thereof, what I claim as new and useful and of my own invention and desire to secure by Letters Patent, is,—

1. In a demountable wheel, the combination with the wheel hub sleeve and the axle sleeve on which it is mounted, and clamping means for detachably clamping the wheel hub and sleeve including a cap or nut, of a friction device disposed within the cap or nut and engaging the latter to rotate therewith but free for independent movement axially with respect thereto, for retaining the nut in applied position.

2. In a demountable wheel, the combination with the wheel hub sleeve and the axle sleeve on which it is mounted, and clamping means for detachably clamping the wheel hub and sleeve including a cap or nut, of coöperating friction members, one of said members mounted within the cap or nut and engaging the latter to rotate therewith but free for independent movement axially with respect thereto, to engage the axle sleeve friction member to retain the nut in applied position.

3. In a demountable wheel, the combination with the wheel hub sleeve and the axle sleeve on which it is mounted, and clamping means for detachably clamping the wheel hub and sleeve including a cap or nut, of a friction member disposed within the cap or nut and engaging the same to rotate therewith but free for independent movement axially with respect thereto, and a relatively fixed coöperating friction member, said friction members operative to retain the nut in applied position.

4. In a demountable wheel, the combination with the wheel hub sleeve and the axle sleeve on which it is mounted, and clamping means for detachably clamping the wheel hub and sleeve including a cap or nut, of frictionally engaging members, means to yieldingly press said members into engaging relation, one of said members being disposed within the cap or nut and engaging the same to rotate therewith but free for independent movement axially with respect thereto, and the other of said members being fixed.

5. In a demountable wheel, the combination with the wheel hub sleeve and the axle sleeve on which it is mounted, and clamping means for detachably clamping the wheel hub and sleeve including a cap or nut, said nut having wrench sockets formed therein, of a disk having notches to receive said wrench sockets whereby said disk rotates with but is free to move axially with relation to said nut, a friction member carried by said disk, a relatively fixed coöperating friction member and a spring operating to press the first named friction member axially with respect to said nut and into frictionally engaging relation with its coöperating friction member.

6. In a wire spoked wheel structure, a detachable hub sleeve, means for detachably clamping the same in place, a screw cap, an axle sleeve upon which said cap is screwed, the end surface of said axle sleeve being provided with seats, and a spring pressed plate carried by said cap and having a peripherally fluted edge portion to coöperate with the seats formed upon the end surface of said axle sleeve.

In testimony whereof I have hereunto set my hand in the presence of the subscribing witnesses, on this 10th day of July, A. D. 1916.

JOSEPH LEDWINKA.

Witnesses:
  L. R. HILYARD,
  A. H. BUXBAUM.